(12) United States Patent
Lopez

(10) Patent No.: US 6,318,984 B1
(45) Date of Patent: Nov. 20, 2001

(54) MOLDING ELEMENT FOR TIRE

(75) Inventor: José Merino Lopez, Riom (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 09/522,648

(22) Filed: Mar. 10, 2000

(30) Foreign Application Priority Data

Mar. 10, 1999 (FR) .................................... 99 03053

(51) Int. Cl.⁷ .................................... B29D 30/68
(52) U.S. Cl. .................... 425/28.1; 425/46; 425/438; 425/DIG. 58
(58) Field of Search .............. 425/28.1, 35, 46, 425/438, 577, DIG. 58

(56) References Cited

U.S. PATENT DOCUMENTS

| 1,733,064 | 10/1929 | Lambert . |
| 5,022,448 | 6/1991 | Ochiai . |
| 6,193,492 | * 2/2001 | Lagnier et al. ............ 425/28.1 |

FOREIGN PATENT DOCUMENTS

| 4429950 | 2/1996 | (DE) . |
| 19612829 | 10/1997 | (DE) . |
| 2772663 | 6/1999 | (FR) . |

* cited by examiner

Primary Examiner—James P. Mackey
(74) Attorney, Agent, or Firm—Baker Botts L.L.P.

(57) ABSTRACT

A molding element for a mold for molding a tread, intended to mold in this tread an incision of circular shape around an axis XX', the main opposing walls of which are connected by a plurality of connecting bridges of rubber mix. This molding element includes two molding parts, each formed by a support extended by at least one molding blade. At least one of the molding parts has a support extended by a blade which is at least partially helical around the axis XX' and mounted freely in rotation around XX' relative to the other molding part. The blades of the molding parts cooperate to define a plurality of orifices intended for molding the connecting bridges. The molding element is characterized in that the molding blades of a first molding part are provided with passages arranged so as to permit the engagement by sliding of the molding blades of the second molding part within the passages to form the molding element in the molding configuration, and in that the support of the second molding part is mounted so as to be mobile in translation relative to the first molding part.

13 Claims, 3 Drawing Sheets

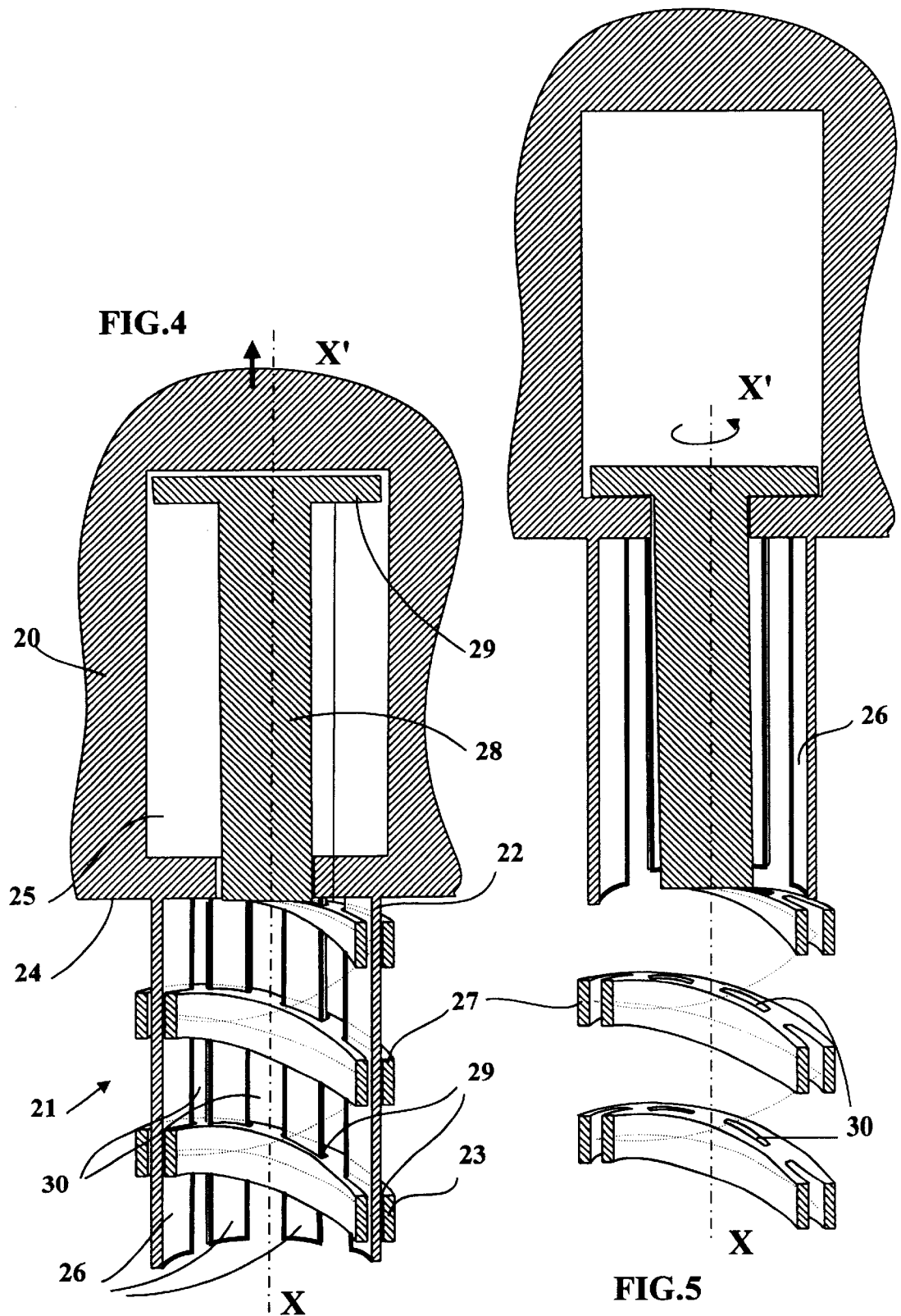

MOLDING ELEMENT FOR TIRE

BACKGROUND OF THE INVENTION

The invention relates to a novel type of molding element intended to be fitted in a mold for molding a cutout in a tread of rubber mix intended to be fitted on a tire, the invention also relates to a mold equipped with this type of molding element.

French Patent Application No. 98-08653 discloses a molding element for molding in a tread an incision of cylindrical geometry defining a rubber block, the lateral wall of which is connected to the rest of the tread by rubber bridges.

In one variant presented in the aforementioned application, a molding element comprises at least two molding parts of generally cylindrical shapes said molding parts being mounted freely in rotation relative to each other about one and the same axis XX'. A first cylinder bears at least one molding blade wound at a first angle around the axis XX' to form a helix and a second cylinder concentric to the first comprises at least one other molding blade wound around the same axis XX' at a second angle of a sign opposite to the sign of the first angle. In this latter configuration, it is envisaged that the molding blades of said two cylinders are arranged such that the blades of the first cylinder and those of the second cylinder are in sliding contact with each other so as to form a sort of trellis defining a plurality of orifices intended to allow the rubber mix to pass during molding to form connecting bridges between the lateral wall of the molded block and the tread.

In this molding element proposed in the aforementioned application, the demolding of a tread after molding and vulcanization, that is to say, the extraction of said molding element from said tread, is made possible without breaking the bridges molded by the structure of the molding parts and their free mounting in rotation relative to the mold. In actual fact, the forces exerted by the rubber on the helical molding blades, during the demolding, create a resultant torque which causes the molding parts to turn about their axis XX'.

With this latter arrangement, it was noted, in particular after several molding operations, that the contact between the blades was insufficient and that films of rubber mix formed between said blades during molding. Consequently, after molding not a single incision but at least two non-interconnected incisions are obtained. The films of rubber mix form walls between the incisions which prevent the free circulation of fluids (air, water) from one incision to the other and isolate them from each other.

Furthermore, the forces exerted by the raw rubber mix at the time of molding and of penetration of the blades into said mix result in deformation of the molding blades, the consequence of which is an increase in the thicknesses of the molded films, and in gradual modification of the geometry of said blades. This deformation is all the more marked since the blades used are of low thickness compared with their length (which is frequently the case for molding incisions of a width of less than 2 mm).

The same defects are noted in the case of molding an incision which does not completely define a rubber block but has a trace on the outer surface of the tread, the geometry of which is in the form of a circle.

SUMMARY OF THE INVENTION

One object of the invention is to propose a molding element making it possible to mold in a tread an incision which is defined by two main walls connected by a plurality of connecting bridges of rubber mix, this molding element comprising two molding parts in contact with each other, said molding element not having the disadvantages which have been described above. Of course, the molding element according to the invention permits demolding without any breaking of the molded connecting bridges. "Demolding" is understood to mean that, with the molding element according to the invention, it is possible completely to extract said molding element from the tread after molding without causing breaking of the molded connection bridges.

To this end, the molding element according to the invention, intended to mold in a tread an incision of circular shape around an axis XX', the main opposing walls of which are connected by a plurality of connecting bridges of rubber mix, comprises two molding parts, each molding part comprising a support extended by at least one molding blade for molding part of said incision. At least one of the molding parts comprises a support extended by a blade which is at least partially in a helix around the axis XX' (that is to say that the blades of this molding part describe only a fraction of a complete revolution around XX'), said support being, mounted freely in rotation around XX' relative to the other molding part.

Furthermore, the molding blades of a first molding part are provided with passages arranged so as to permit the engagement by sliding of the molding blades of the second molding part within said passages to form the molding element in the molding configuration and thus to form a plurality of orifices intended to allow the rubber mix to pass for molding the connecting bridges. Furthermore, to permit the engagement and disengagement (reverse movement to the engagement) of the blades of the second molding part in the passages provided on the first molding part, said second molding part is mounted to be mobile in translation in the direction XX' relative to said first part.

This molding element makes it possible to mold in a tread an incision, the trace of which over the outer surface of said tread has the geometry of an are of a circle.

The molding element according to the invention also makes it possible to mold an incision, the trace of which over the outer surface of said tread has the geometry of a circle and defines a rubber block of cylindrical shape of axis XX', this block of rubber having a lateral wall which is connected to the tread by a plurality of connecting bridges.

To this end, the molding element comprises two molding parts each formed of a support extended by at least one molding blade, the molding blades of at least one of the two molding parts having the form of a helix wound around an axis XX', forming at least one complete turn. Furthermore, each molding part bearing at least one blade having the form of a helix is mounted to be mobile in rotation around XX' relative to the other molding part.

This molding element is characterized in that:
 the blades of a first molding part are provided with passages permitting the engagement by sliding of the blades of a second molding part to form the molding element in the molding configuration,
 the second molding part, the blades of which are engaged in the passages in the first molding part, is assembled with said first part to form the molding element so as to be mobile in translation in the direction XX' relative to the first molding part, in order to permit the engagement (and disengagement) of the blades of this second molding part within said passages.

In the present description, when reference is made to a first molding part of a molding element, this is defined as the one of the molding parts of said molding element the blades of which are provided with passages for engaging the blades of another molding part (referred to as second molding part).

At the moment of demolding, the relative movements of translation and rotation of the molding parts relative to each other systematically involves the breaking of any rubber films which may have been molded in the clearances existing between the passages provided on the blades of the first molding part and the blades of the second molding part.

A molding element according to the invention may be used equally well for equipping a mold for molding a tire or a mold for molding a tread intended, for example, for recapping a tire.

Another subject of the invention relates to a mold for molding a tread intended to be fitted on a tire, said mold molding at least one incision defining a rubber block of cylindrical shape connected to the tread on its lateral wall by at least one rubber bridge.

This mold has a molding surface over which projects a first molding part comprising at least one blade and a second molding part formed by at least one blade having the form of a helix around an axis XX'.

The second molding part is borne by a support mounted freely in rotation within a housing provided on the mold. The first and second molding parts cooperate to mold an incision which isolates a rubber block of generally cylindrical shape of axis XX', the lateral wall of which is connected to the tread by at least one rubber bridge.

The mold according to the invention is characterized in that:
  the blades of the first molding part are provided with passages for the engagement by sliding of the blades of the second part in the passages provided on the blades of said first part in order to obtain the molding configuration,
  the second molding part is mounted so as to be mobile in translation in the direction XX' within its housing in the mold, suitably to permit the disengagement of the blades of the first molding part from the passages provided on the second molding part in order to permit demolding of the molding element without breaking the rubber bridges.

Other possibilities and advantages of the molding element and a mold according to the invention will be provided with the description of the following drawings, the aim of which is to present variant embodiments in non-limitative manner.

DESCRIPTION OF THE DRAWINGS

FIG. 4 shows a mold provided with a housing in which a molding part is mounted in mobile manner.

FIG. 5 shows the mold of FIG. 4 during the demolding operation.

DESCRIPTION OF PREFERRED EMBODIMENTS

Figure 1:
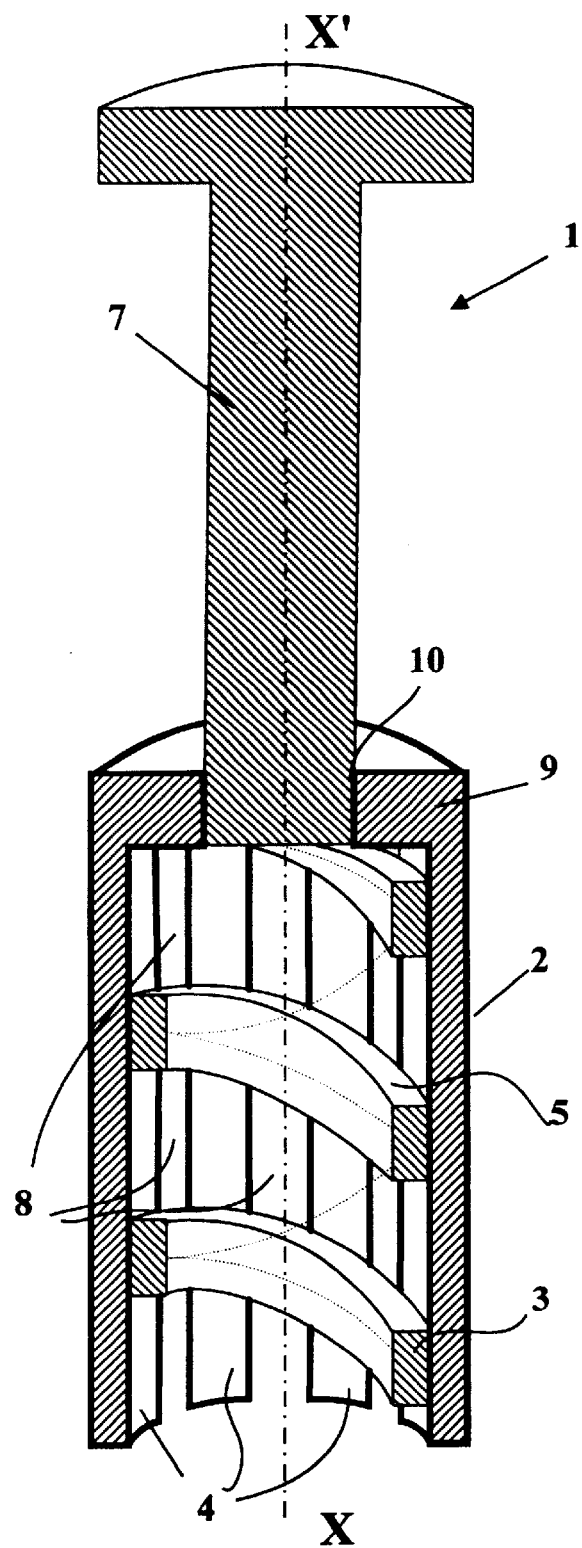
FIG. 1 shows a molding element comprising two molding parts having their walls in contact and defining a plurality of orifices for the rubber to pass through during the molding of a tread.

In FIG. 1, there can be seen a molding element 1 intended to equip a mold for molding a tire tread. This molding element 1, which is intended for molding in the rubber tread an incision of cylindrical geometry of axis XX', comprises two molding parts 2 and 3. The molding part 2 is formed of a support 9 extended by a plurality of blades 4 extending substantially parallel to the direction of the axis XX'. The molding part 3 comprises a cylindrical support 7 of axis XX', mounted passing through the support 9 of the first molding part 2, said support 27 bearing a blade 5 helically wound around the axis XX'.

In the molding configuration shown in FIG. 1, the blades 4 are in contact with the helical blade 5 so as to define a plurality of orifices to allow the rubber to pass during the molding of a tread. The contacting of said blades 4 and 5 makes it possible to mold virtually a single incision, that is to say, one having a continuity of volume.

As has already been mentioned, the numerous molding operations performed with this molding element are frequently the cause of the appearance of a clearance or space between the blades 4 and the blade 5: as a result, the molded incisions are no longer joined to form only a single one due to the presence of rubber films of greater or lesser thickness, which are therefore more or less resistant to tearing.

Figure 2:
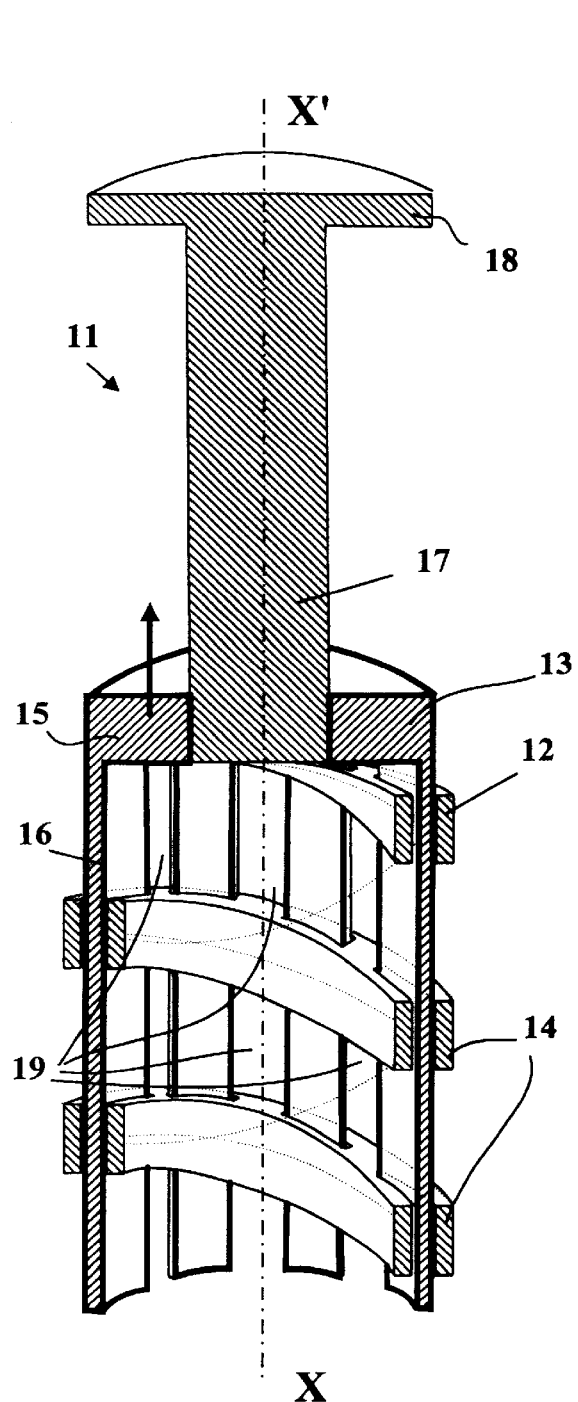
FIG. 2 shows a first variant of a molding element according to the invention in the molding configuration, the molding element comprising two molding parts, one of said molding parts being provided with holes for the passage and positioning of the blades of the other molding part.

To avoid this defect, there is proposed a novel molding element, one variant of which is shown in FIG. 2. In this FIG. 2, which shows a molding element 11 according to the invention in the molding configuration, there can be seen:
  a first molding part 12 formed of a blade 14 wound helically around an axis XX', said blade 14 being borne by a cylindrical support 17 at one end; the other end of the support 17 is provided with a widened part forming a shoulder 18;
  a second molding part 13 comprising a plurality of blades arranged at equal distance from the axis XX' and extending in the direction XX', said blades 16 being borne by a cylindrical support 15.

Furthermore, and identically to the mounting of the molding element shown in FIG. 1, the first molding part 12 is assembled with the second molding part 13 such that the support 17 of the former can slide in the direction XX' relative to the support 15 of said second part.

Furthermore, the blade 14 of the first molding part 12 is provided with a plurality of passages 21 passing through said blade within its entire width in the direction XX', said passages 21 being arranged suitably to permit the engagement by sliding of the blades 16 of the second molding part 13 within said passages to form the molding element 11 in its molding configuration.

Figure 3:
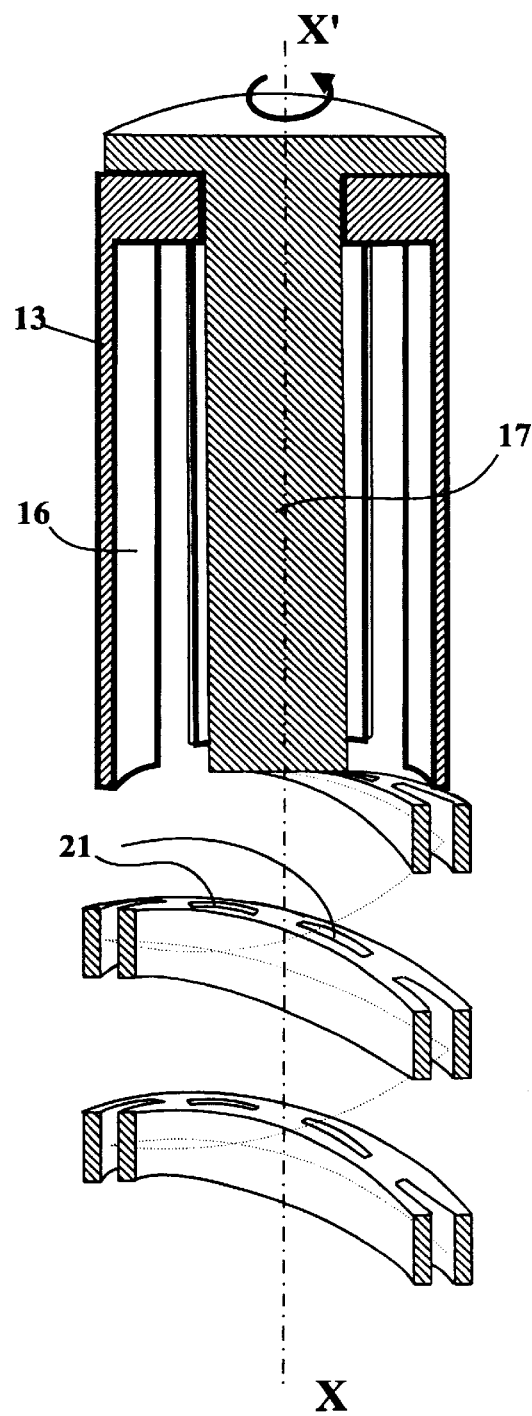
FIG. 3 shows the molding element of FIG. 2 in an intermediate demolding phase.

In this manner, it is possible to mold a single incision formed by the incisions molded by the different blades 14 and 16 of the molding element 11, any rubber films formed during molding and locally obstructing said incision being torn at the moment of demolding, one phase of which is illustrated in FIG. 3.

Furthermore, the mounting of the molding element according to the invention imparts thereto sufficient rigidity to enable it to resist the forces exerted on said element at the moment of penetration into the rubber mix forming the tread to be molded.

In FIG. 3, the molding element of FIG. 2 is shown after a first phase of the demolding. In this first phase, the second molding part 13, the blades of which are engaged in those of the first part, has been displaced in the direction XX' relative to said first molding part 12 by a quantity suitable for disengaging all the straight blades 16 from the holes 21 provided on the blade 14 of the first molding part 12 and so that the support of the second molding part 13 is in contact with the shoulder 18 of the support 17 of the first molding part.

Once arrived in this position, if the translational movement of said molding element 11 is continued parallel to XX', the helical blade 14, which is mounted freely in rotation relative to the molding part 13, can then turn about the axis XX' to finish the demolding.

"Passage made in a blade comprising walls" is understood to mean either a hole formed within a blade itself (and opening on to two walls) for engagement by sliding of another blade as shown in FIGS. 2 and 3, or a sort of notch which is not totally closed (that is to say, one opening on to three walls of said blade) as shown in FIG. 5. In fact, having noted that it might be difficult and costly to make the passages in the form of holes in a blade by machining, it is proposed to machine using a cutting wire for a notch opening on to one of the walls of the blade in question. The shape of the cutout is determined to permit the passage of a blade of another molding part, while ensuring the guidance and holding thereof during the phase of penetration of the molding element into a rubber tread.

In one variant of the molding element according to the invention, the first molding part comprises at least one straight blade provided with passages intended for the engagement by sliding of helical blades of a second molding part; during the first molding stage, the helical blades are disengaged from the passages before the straight blades of the first part are extracted from the molded tread.

Another variant consists in replacing the straight blades of the second molding part with blades also wound in a helix around XX', but in a direction of rotation opposite to that of the blades of the first molding part. In this case, the helical blades of the second part are mounted on a support mounted freely in rotation about XX'. During the first stage of demolding, the blades of the second molding part are disengaged from the passages provided on the first part by a translational movement along XX' and by a rotational movement about XX'.

In the example of a molding element described with reference to FIGS. 2 and 3, it is not necessarily essential for the blade or blades engaged in the passages to be completely disengaged from all the passages to finish demolding, because in order to ensure correct, easy repositioning of said blades to reform the molding element in the molding configuration, it is advantageous for each blade still to remain engaged in at least one passage. This passage may be located outside the molded tread (for example, this passage is intended to be within the mold equipped with said molding element). In this variant, it is of course necessary for the two molding parts to be able to rotate together about XX' in the final phase of demolding.

Advantageously, and in order to aid the demolding movement, the molding element according to the invention is equipped with means for forcing rotation on at least one molding part comprising a molding blade wound helically about XX'.

Advantageously, the molding element according to the invention furthermore comprises elastic return means for engaging blades of the second molding part within the passages provided on the blades of the first molding part in order to reform the molding element in its molding configuration before proceeding to mold another tread.

A mold for molding a tread may be equipped with at least one molding element according to the invention, or alternatively be made as described hereafter with reference to FIGS. 4 and 5.

FIG. 4 shows a section through a mold part 20 comprising a molding element 21 for molding in a tread a cylindrical incision defining a block of rubber mix connected to said tread by a plurality of connecting bridges. This molding element 21 comprises a first molding part 23 and a second molding part 22 both projecting over the molding surface 24 of said mold. This mold furthermore comprises a housing 25 opening on to its molding surface 24.

The first molding part 23 comprises a blade 27 which is helically wound about XX', forming a plurality of turns, and is borne by a cylindrical support 28 having the same axis XX'; this first molding part 23 is mounted in the housing 25 formed in the mold 20 so that its support 28 is both free in rotation about XX' and in translation within said housing 25. A shoulder 29 provided on the end of the support 28 which is axially farthest from the molding surface 24 makes it possible to restrict the translational movement in the direction XX' of the second molding part 23 relative to the mold 20.

The second molding part 22 comprises a plurality of blades 26 oriented in the direction of the axis XX', these blades being mounted integrally with the mold 20 so as to copy all the movements of said mold. In a plane perpendicular to the axis XX', the blades 26 have a geometry in the form of an arc of a circle.

The helical blade 27 is provided with a plurality of passages 29 passing through said blade in the direction XX' to permit the positioning by sliding of the straight blades 26 to obtain the molding configuration. In this configuration, the helical blade 27 and the straight blades 26 cooperate to form one and the same molding element for molding an incision of overall cylindrical geometry of axis XX', isolating a rubber block, the main walls of which are connected to the tread by a plurality of rubber connecting bridges molded in the spaces 30 formed by the helical blade 27 and blades 26.

In FIG. 5, this same molding element 21 is shown after a first demolding phase which consisted in moving the mold 20 in its demolding direction parallel to the direction XX'. In this first phase, the mold entrains with it the straight blades 26, while the helical blade 27 remains within the molded tread, the support of said blade being displaced within the housing 25.

After extraction of the straight blades 26 from the molded material and from the passages 29 provided in the helical blade 27, the support of the second part of the molding element coming into contact with stops provided on the mold, the latter in turn entrains said second part which rotates under the action of the contact forces of the rubber on the helical blade. Thus it is possible to effect demolding in a single demolding movement (in the same direction) without breaking the molded connecting bridges.

The blades 26 of the second molding part 22 may advantageously have a continuously variable cross-section, the largest section being located close to the molding surface 24; this arrangement ensures appropriate rigidity to permit good positioning and to facilitate the demolding of said blades. Of course, the passages provided on the helical blade 27 have appropriate sections. Generally, it is advantageous for the cross-section of any one of the blades of the first and second molding parts to be variable and decreasing starting from the molding surface.

The example presented with a single helical blade can easily be extended to the case of a plurality of helical blades mounted on one and the same support, said blades being wound in the same direction around XX' to permit demolding by rotation.

The mold described in FIGS. 4 and 5 makes provision for a helical blade to be provided with passages for engaging straight blades integral with all the movements of the mold;

it is also possible to envisage the passages being provided on the straight blades to permit the engagement of the helical blades. In this variant, additional means are provided to cause the helical blades to rotate within the housing in the mold so as to disengage said blades and to effect the first demolding phase. Then, by displacing the mold in its direction of demolding, and with it the straight blades, it is easy to terminate the demolding without breaking the molded connecting bridges.

I claim:

1. A molding element for equipping a mold for molding a tread and intended to mold in this tread an incision of circular shape around an axis XX', the main opposing walls of which are connected by a plurality of connecting bridges of rubber mix, said molding element comprising two molding parts, each molding part being formed by a support extended by at least one molding blade for molding part of said incision, at least one of the molding parts comprising a support extended by a blade which is at least partially helical around the axis XX', said support being mounted freely in rotation around XX' relative to the other molding part, the blades of said molding parts cooperating to define a plurality of orifices intended for molding the connecting bridges, the molding element being characterized in that:

the molding blades of a first molding part are provided with passages arranged so as to permit the engagement by sliding of the molding blades of the second molding part within said passages to form the molding element in the molding configuration and thus to form a plurality of orifices intended to allow the rubber mix to pass for molding the connecting bridges, and in that the support of the second molding part is mounted so as to be mobile in translation relative to the first molding part, to permit the engagement of the blades of said second molding part in the passages provided on the first molding part and the disengagement thereof during demolding.

2. A molding element according to claim 1, characterized in that this molding element comprises at least one molding blade, borne by one of the molding parts of the molding element, which is wound around the axis XX' in the form of a helix, forming at least one complete turn, to mold an incision defining a rubber block of cylindrical shape of axis XX', said block having its lateral wall connected to the tread by a plurality of rubber bridges.

3. A molding element according to claim 2, wherein each blade of the first molding part has a helical geometry about the axis XX' and is provided with at least one passage to permit the engagement of a blade of the second molding part and in that said first part is mounted freely in rotation about the axis XX', so as to be able to rotate about this axis XX' during demolding.

4. A molding element according to claim 3, wherein each blade of the second molding part is a straight blade substantially parallel to the axis XX' capable of sliding within at least one passage formed on the first molding part.

5. A molding element according to claim 3, wherein each blade of the second molding part has a helical geometry turning in the opposite direction to the direction of winding of each blade of the first molding part and in that said second part is mounted both to be mobile in translation along XX' and free in rotation about the axis XX', so as to permit demolding without breaking the connecting bridges.

6. A molding element according to claim 1, wherein the first molding part comprises at least one straight blade, and in that the second molding part comprises at least one helical blade, said straight blade being provided with at least one passage permitting the engagement by sliding of a blade of said second part to obtain the molding configuration.

7. A molding element according to claim 1, wherein means are provided for forcing rotation on at least one molding part comprising a molding blade wound helically about XX'.

8. A molding element according to claim 1, wherein elastic return means are provided for engaging the blades of the second molding part within the passages provided on the blades of the first molding part in order to reform the molding element in its molding configuration.

9. A mold for a tread intended to be fitted on a tire comprising at least one molding element according to claim 1.

10. A mold for a tread intended to be fitted on a tire, this mold having a molding surface over which project two molding parts, one molding part comprising at least one blade extending in a direction perpendicular to the molding surface and integral with the movements of the mold, and another molding part formed by at least one blade having the form of a helix around an axis XX', this other molding part being borne by a support mounted freely in rotation within a housing provided on the mold, said molding parts cooperating to form a molding element which defines a plurality of orifices and is intended to mold a block of rubber mix of cylindrical form of axis XX', said block having a lateral wall connected to the tread by a plurality of connecting bridges, said mold being characterized in that:

the helical blades of a first molding part are provided with passages for the engagement by sliding of the blades of a second molding part in said passages in order to obtain the molding configuration, the first molding part is mounted so as to be mobile in translation in the direction XX' within its housing in the mold, suitably to permit the disengagement of the blades of the second molding part from the passages in order to permit demolding of the molding element without breaking the rubber bridges.

11. A mold for a tread according to claim 10, characterized in that passages are provided on each blade which is integral with the mold to permit the engagement of the helical blades to form the molding element in its molding configuration.

12. A mold for a tread according to claim 10, characterized in that means are provided for restricting the translational movement of a molding part relative to the other molding part so that at least one molding blade remains engaged in a passage when demolding is ended, so as to guide the engagement movement of each blade before effecting another molding operation.

13. A mold for a tread according to claim 10, characterized in that there are furthermore provided means for imposing a rotational movement on the support bearing at least one helical blade so as to effect the molding configuration and/or to facilitate the demolding of said element.

* * * * *